US009671977B2

(12) United States Patent
Olson et al.

(10) Patent No.: US 9,671,977 B2
(45) Date of Patent: Jun. 6, 2017

(54) HANDLING DATA BLOCK MIGRATION TO EFFICIENTLY UTILIZE HIGHER PERFORMANCE TIERS IN A MULTI-TIER STORAGE ENVIRONMENT

(71) Applicant: International Business Machines Corporation, Armonk, NY (US)

(72) Inventors: John T. Olson, Tucson, AZ (US); Sandeep R. Patil, Pune (IN); Riyazahamad M. Shiraguppi, Pune (IN); Gail A. Spear, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 442 days.

(21) Appl. No.: 14/248,115

(22) Filed: Apr. 8, 2014

(65) Prior Publication Data

US 2015/0286413 A1 Oct. 8, 2015

(51) Int. Cl.
*G06F 12/00* (2006.01)
*G06F 3/06* (2006.01)
*G06F 17/30* (2006.01)

(52) U.S. Cl.
CPC ............ *G06F 3/0647* (2013.01); *G06F 3/061* (2013.01); *G06F 3/0685* (2013.01); *G06F 17/30079* (2013.01)

(58) Field of Classification Search
CPC .... G06F 3/0608; G06F 3/0688; G06F 3/0685; G06F 2003/0692; G06F 3/0647; G06F 3/0641; G06F 3/0655
See application file for complete search history.

(56) References Cited

U.S. PATENT DOCUMENTS

| 6,735,678 | B2 | 5/2004 | Noble et al. |
| 7,124,272 | B1 | 10/2006 | Kennedy et al. |
| 7,447,836 | B2 | 11/2008 | Zhang et al. |
| 7,702,870 | B2 | 4/2010 | English et al. |
| 8,386,434 | B2 | 2/2013 | Kusters et al. |
| 8,560,801 | B1 | 10/2013 | Pendharkar et al. |

(Continued)

OTHER PUBLICATIONS

Dufrasne et al., "IBM System Storage DS8000 Easy Tier Server," Redpaper, International Business Machines Corporation, 2013, pp. 1-94.

(Continued)

*Primary Examiner* — Reginald Bragdon
*Assistant Examiner* — Hannah A Faye-Joyner
(74) *Attorney, Agent, or Firm* — Zilka-Kotab, P.C.

(57) ABSTRACT

In one embodiment, a method for managing data includes receiving migration information that describes movement of data stored to a direct access storage device (DASD) during a data migration operation that causes at least one portion of the data to be moved from a first location in a first tier of a multi-tier file system to a second location in a second tier of the multi-tier file system, determining whether to swap data usage statistics for the second location with data usage statistics for the first location, and swapping the data usage statistics for the second location with the data usage statistics for the first location when the determination is to swap the data usage statistics. Other systems, methods, and computer program products for managing data in a multi-tier file system are described according to more embodiments.

20 Claims, 12 Drawing Sheets

(56) References Cited

U.S. PATENT DOCUMENTS

| | | |
|---|---|---|
| 2008/0077762 A1 | 3/2008 | Scott et al. |
| 2009/0055450 A1 | 2/2009 | Biller |
| 2010/0180093 A1 | 7/2010 | Huber et al. |
| 2012/0198107 A1* | 8/2012 | McKean ................ G06F 13/18 710/40 |
| 2012/0198152 A1 | 8/2012 | Terry et al. |

OTHER PUBLICATIONS

"Defragmentation," Wikipedia, Retrieved From https://web.archive.org/web/20140401002129/http://en.wikipedia.org/wiki/Defragmentation on Apr. 1, 2014.

\* cited by examiner

HANDLING DATA BLOCK MIGRATION TO EFFICIENTLY UTILIZE HIGHER PERFORMANCE TIERS IN A MULTI-TIER STORAGE ENVIRONMENT

BACKGROUND

The present invention relates to management of a multi-tier storage environment, and more specifically, this invention relates to efficient management of high performance tiers in a multi-tier storage environment.

A file system defines how files are named and manages how they are placed for storage and retrieval. File system functionality may be divided into two components: a user component and a storage component. The user component is responsible for managing files within directories, file path traversals, and user access to files. The storage component of the file system determines how files are stored physically on the storage device.

In addition, a file system may attempt to efficiently place data in different locations according to the importance of the data and how frequently it is accessed. When data is migrated from one physical location to another, the strategic placement of the data may be lost and applications which access the data may have their performance suffer.

BRIEF SUMMARY

In one embodiment, a method for managing data includes receiving migration information that describes movement of data stored to a direct access storage device (DASD) during a data migration operation that causes at least one portion of the data to be moved from a first location in a first tier of a multi-tier file system to a second location in a second tier of the multi-tier file system, determining whether to swap data usage statistics for the second location with data usage statistics for the first location, and swapping the data usage statistics for the second location with the data usage statistics for the first location when the determination is to swap the data usage statistics.

In another embodiment, a computer program product for managing data includes a computer readable storage medium having program code embodied therewith, the program code readable and/or executable by a processor to cause the processor to: receive migration information that describes movement of data stored to a DASD during a data migration operation that causes at least one portion of the data to be moved from a first location in a first tier of a multi-tier file system to a second location in a second tier of the multi-tier file system, determine whether to swap data usage statistics for the second location with data usage statistics for the first location, and swap the data usage statistics for the second location with the data usage statistics for the first location when the determination is to swap the data usage statistics.

According to another embodiment, a system includes a processor and logic integrated with and/or executable by the processor, the logic being configured to cause the processor to: perform a data migration operation on data stored to a DASD that causes at least one portion of the data to be moved from a first location in a first tier of a multi-tier file system to a second location in a second tier of the multi-tier file system, determine whether the second location was unallocated prior to the data migration operation or whether the at least one portion was swapped with a second portion at the second location during the data migration operation and send data migration information indicating whether the second location was unallocated or whether the at least one portion was swapped with the second portion.

Other aspects and embodiments of the present invention will become apparent from the following detailed description, which, when taken in conjunction with the drawings, illustrate by way of example the principles of the invention.

DETAILED DESCRIPTION

Figure 1A:
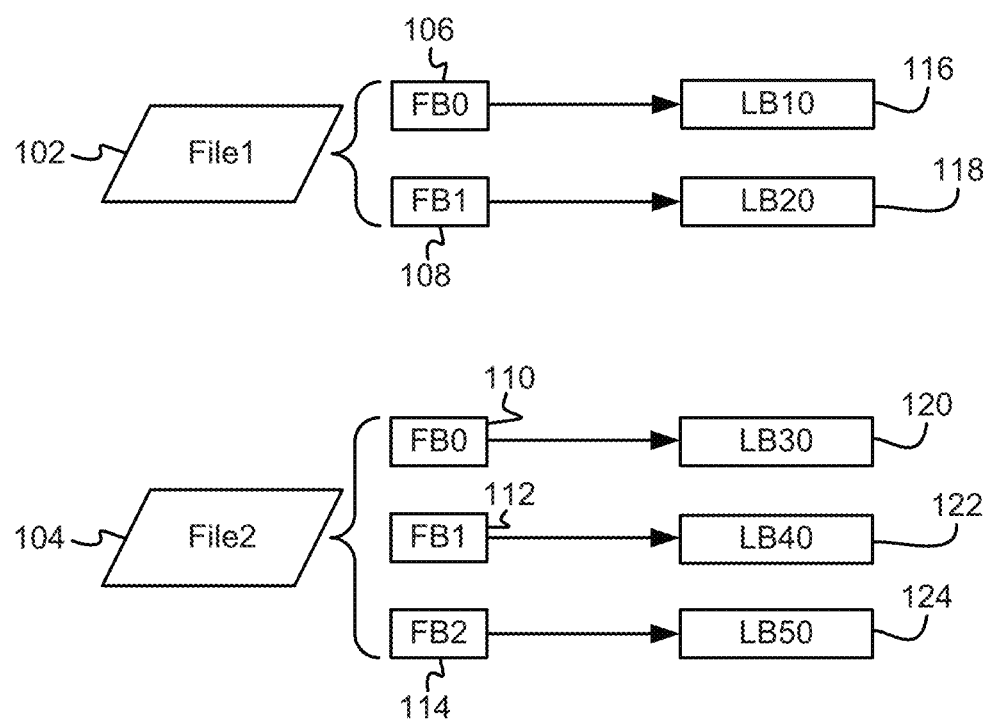
FIG. 1A illustrates logical block mapping for a file system, in one example.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred embodiments of systems, methods, and computer program products for efficient management of higher tiers in a multi-tiered file system, particularly with regard to managing data usage statistics after file migration.

In one general embodiment, a method for managing data includes receiving migration information that describes movement of data stored to a direct access storage device (DASD) during a data migration operation that causes at least one portion of the data to be moved from a first location in a first tier of a mufti-tier file system to a second location in a second tier of the multi-tier file system, determining whether to swap data usage statistics for the second location with data usage statistics for the first location, and swapping the data usage statistics for the second location with the data usage statistics for the first location when the determination is to swap the data usage statistics.

In another general embodiment, a computer program product for managing data includes a computer readable storage medium having program code embodied therewith, the program code readable and/or executable by a processor to cause the processor to: receive migration information that describes movement of data stored to a DASD during a data migration operation that causes at least one portion of the data to be moved from a first location in a first tier of a multi-tier file system to a second location in a second tier of the multi-tier file system, determine whether to swap data usage statistics for the second location with data usage statistics for the first location, and swap the data usage statistics for the second location with the data usage statistics for the first location when the determination is to swap the data usage statistics.

According to another general embodiment, a system includes a processor and logic integrated with and/or executable by the processor, the logic being configured to cause the processor to: perform a data migration operation on data stored to a DASD that causes at least one portion of the data to be moved from a first location in a first tier of a multi-tier file system to a second location in a second tier of the multi-tier file system, determine whether the second location was unallocated (prior to the data migration operation or whether the at least one portion was swapped with a second portion at the second location during the data migration operation and send data migration information indicating whether the second location was unallocated or whether the at least one portion was swapped with the second portion.

FIG. 1A shows an example of logical block mapping of a file system. Users are able to store their data and/or access data in single and/or multiple files, such as File1 102 and File2 104. Each file may be divided into multiple blocks. As shown in FIG. 1A, the first file, e.g., File1 102, may be stored across a plurality of file blocks, e.g., File Block 0 (FB0) 106 and FB1 108. The second file, e.g., File2 104 may also be stored across a plurality of file blocks, e.g., FB0 110, FB1 112, and FB2 114.

The file system is configured to map each file block to a logical block. As shown in FIG. 1A, each of the file blocks is logically mapped to a logical block. For example, FB0 106 is mapped to logical block 10 (LB10) 116, and FB1 108 is logically mapped to LB20 118. Likewise, FB0 110 is logically mapped to LB30 120, FB1 112 is logically mapped to LB40 122, and FB2 114 is logically mapped to LB50 124.

In a dynamic storage scenario on a disk of a hard disk drive (HDD), the files and other objects stored to the disk grow in size over time, thereby requiring more space to store these files and objects, which causes subsequent allocations of space for the storage of additional files or Objects to be from non-contiguous locations on the disk. This leads to disk fragmentation or the discontinuous storage of various chunks or blocks of single logical objects. Unless maintenance is performed by the process of defragmentation, performance, time to access data, and reliability of data, may all be adversely impacted.

Figure 1B:
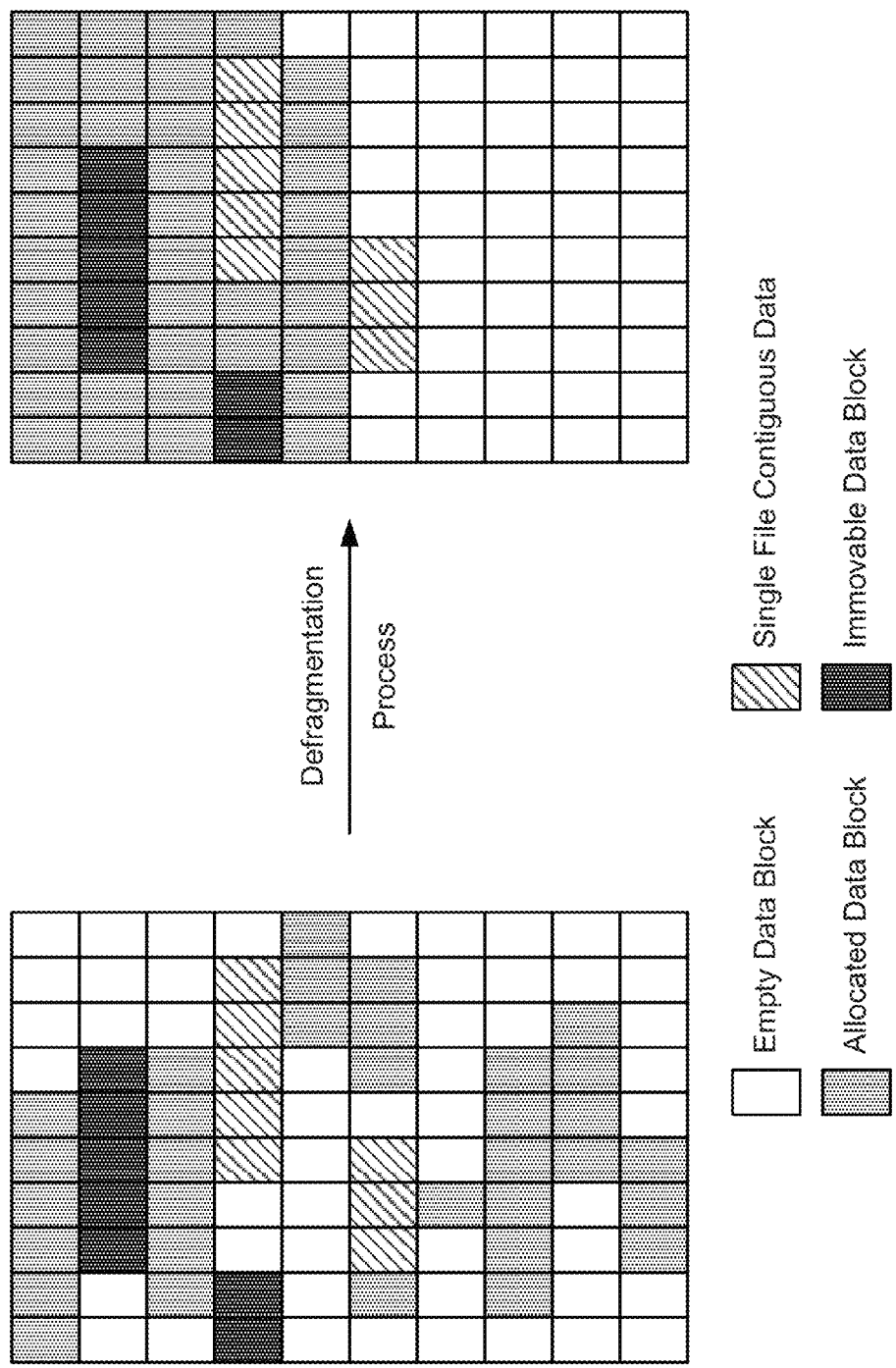
FIG. 1B shows a disk defragmentation process, in one example.

With reference to FIG. 1B, disk defragmentation describes the process of consolidating fragmented files on a hard disk. Disk defragmenter applications are tools that rearrange the data on a hard disk and reunite fragmented files so that processors that access the data may run more efficiently. Disk management and defragmentation are part of many operating systems (OSs) or may be available independently. All of these utilities work by targeting a disk volume or a partition, and in some rare cases, a directory structure. Defragmentation involves moving sparsely distributed data to a contiguous location on the disk. This location is preferred to be file blocks on the outer tracks as read/write performance is higher/better on the outer tracks. There may be some immovable file blocks on the disk which are not able to be moved and should be ignored during disk defragmentation. A few advanced defragmenters also consider whether it is necessary to move the file when it is already contiguously allocated or has a sufficiently large chunk of data that is contiguous on the disk, e.g., the defragmenter on Windows Vista does not move single file contiguous data chunks when they are more than 64 MB in size. In this case, those file blocks are not moved during the defragmentation process.

Multi-tiered storage is capable of using a storage method where data is stored on various types of storage devices primarily based on various criteria, such as the access requirements for the data, frequency of use of the data, security of the data, and data recovery requirements. For example, data that is frequently accessed by an application that is response-time sensitive might be stored on solid state drives (SSDs), a SSD array, flash memory or flash storage, a flash array, etc. Other data that is infrequently accessed and for which a longer response time is more tolerable might be stored on high capacity HDDs, such as 10,000+ RPM HDDs, 7200 RPM HDDs, etc. The cost per gigabyte of storage is much higher for SSDs than it is for the HDDs. One challenge in effectively using multi-tiered storage is identifying the data that benefits from the higher cost/higher performance storage tiers. Over time, the optimal storage tier for a given piece of data may change. Thus, the identification and movement of data to an appropriate tier is an ongoing process.

Since SSDs are costlier than HDDs, solutions which allow for dynamic relocation of data across tiers based on the data usage by placing "hot" data with high I/O density and low response time requirements on SSDs while targeting HDDs or other slower-responding data storage devices for "cooler" data that is accessed more sequentially and/or at lower rates are preferred.

Figure 2:
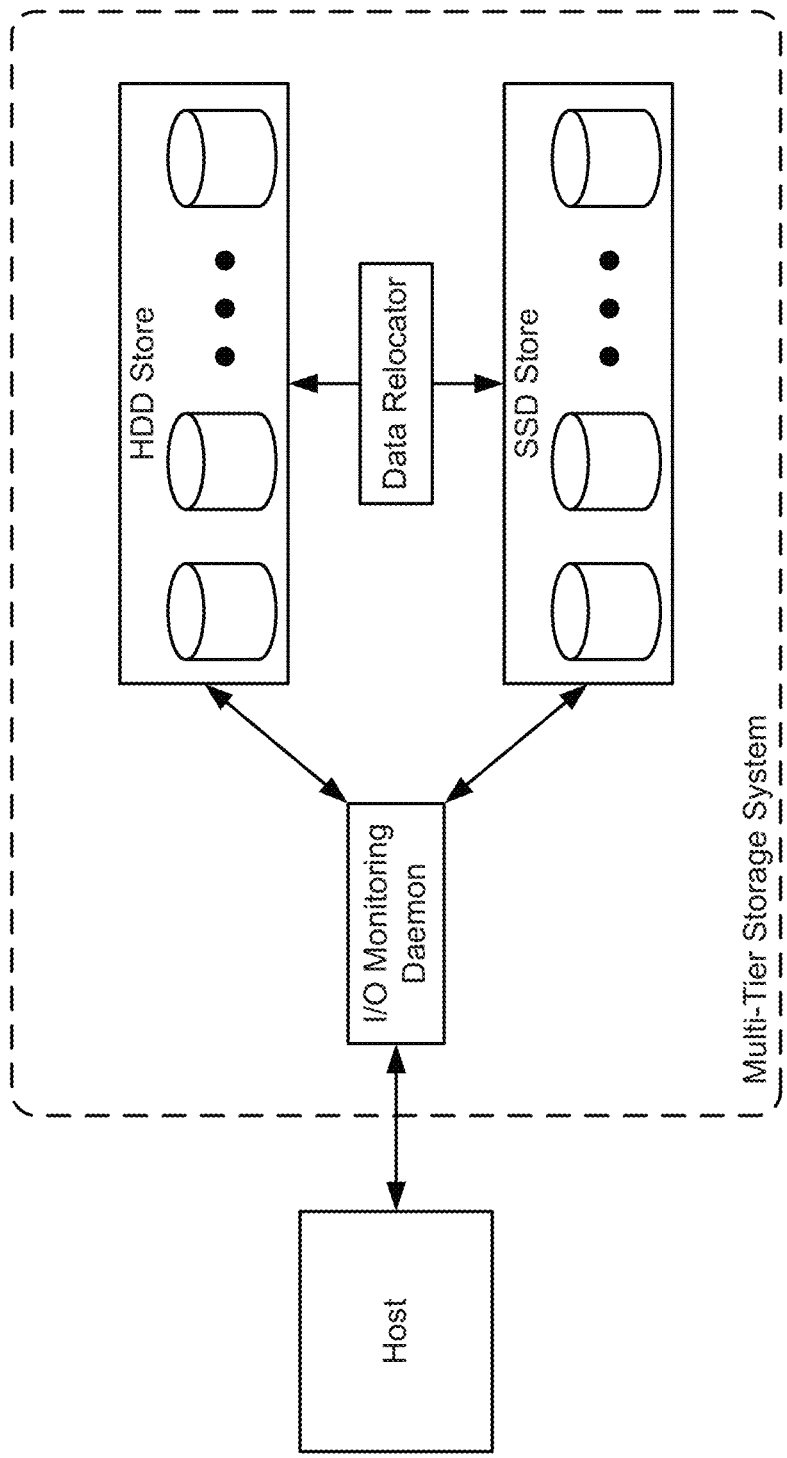
FIG. 2 shows a multi-tiered file system.

As shown in FIG. 2, an I/O monitoring daemon, which monitors for I/Os performed on HDDs, may be provided with a multi-tier storage system. This multi-tier storage system may be based on an IBM Easy-Tier architecture or some other multi-tier system known in the art. Based on data access frequency, the I/O monitoring daemon identifies data that is heavily accessed (hot). A data relocator puts this hot data on SSDs for high throughput, tow response times, and I/O operations per second (IOPS)-energy-efficient characteristics. As a result, the amount of expensive storage required to meet a given level of performance is minimized compared to other methods of data placement for tiered storage.

Figure 3A:
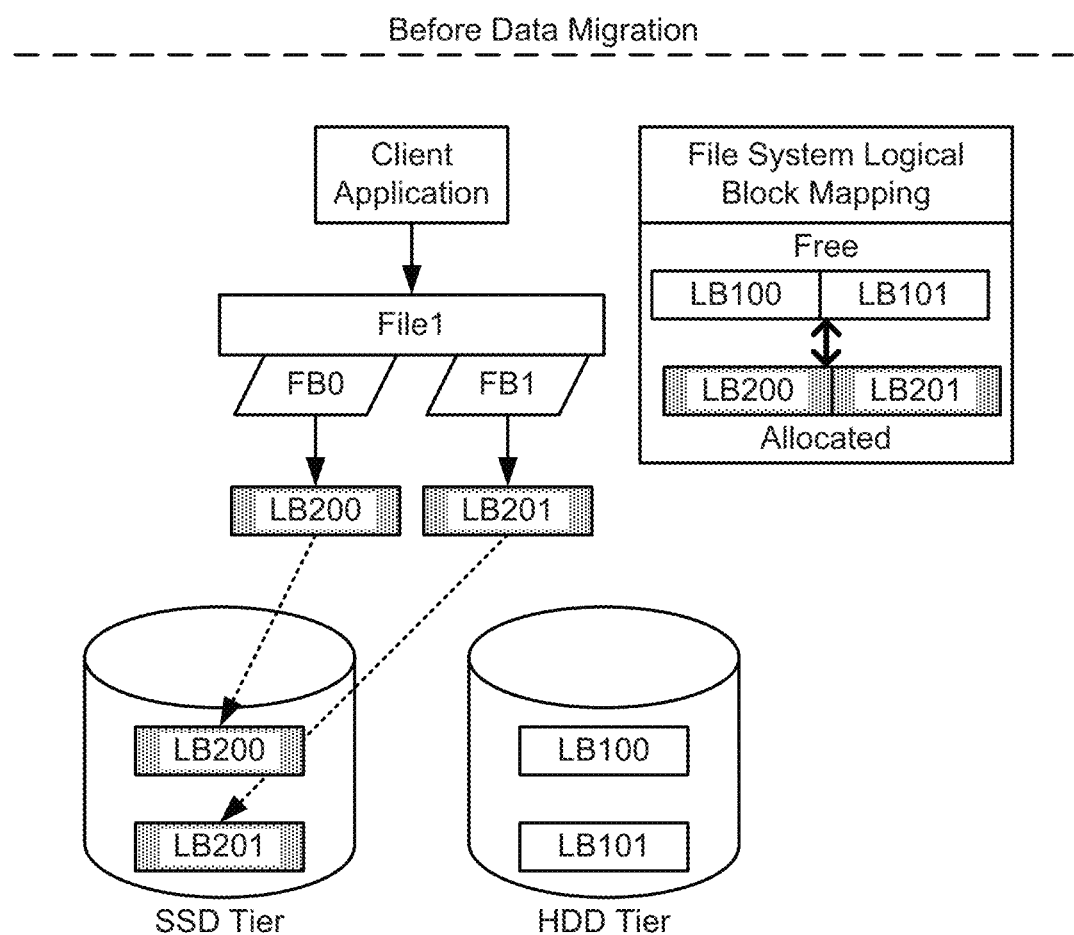
FIGS. 3A-3B illustrate a problem with file migration in a multi-tiered file system.
Figure 3B:
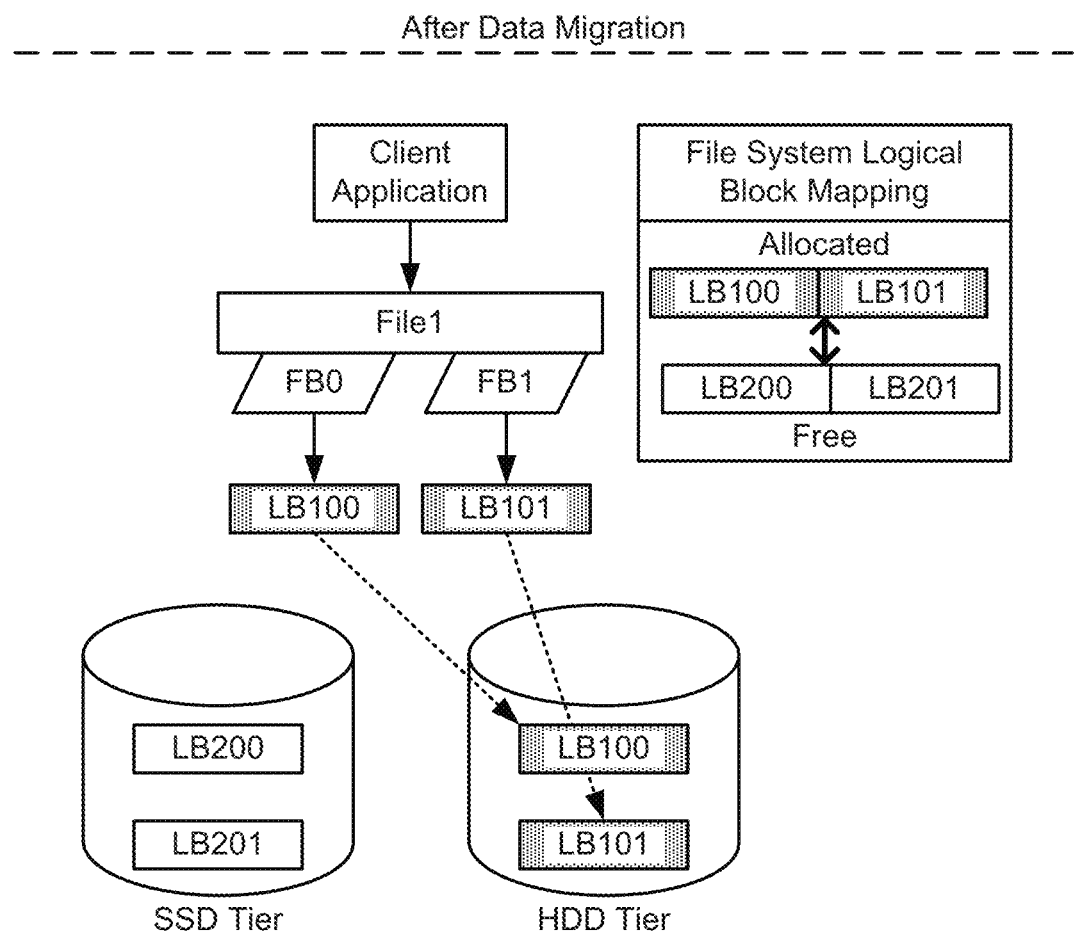

One of the issues with data migration on a multi-tiered film system is described with regard to FIGS. 3A-3B. Data migration may be caused by the activities of a disk defragmentation process. Some other processes may also cause data to be migrated from one storage pool to another storage pool similar to disk defragmentation, such as information life cycle management, where data is migrated according to its age or some other criteria. After these processes have been performed, problems may also be encountered with system performance.

A situation is shown in FIG. 3A where a client application is accessing File1 which corresponds to file blocks FB0 and FB1. These file blocks are logically mapped to logical block LB200 and LB201. Because data usage statistics, such as an amount of access requests by the client application directed to FB0 (LB200) and FB1 (LB201), indicate that FB0 and FB1 are frequently accessed (above some predetermined access threshold), the file system has allocated the data for these file blocks to the higher performance storage tier, in this example, the solid state drive (SSD) tier. The multi-tier system identifies logical blocks LB200 and LB201 as "hot" blocks and places them in the SSD tier which provides performance benefits for client applications while accessing FB0 and FB1 versus lower tiers, as shown in this example as a hard disk drive (HDD) tier.

In addition, in this example, there is another set of logical blocks, LB100 and LB101, which are currently free (having no data stored therein and/or unallocated to any file blocks). These logical blocks might never be allocated or may have become freed due to some other file deletion, migration, etc. Since applications are not accessing these logical blocks, these logical blocks, as indicated by the data usage statistics, do not have a sufficient number of accesses or access requests to qualify as being "hot" to be stored in the higher tier, e.g., the SSD tier. Therefore, these logical blocks, LB100 and LB101 are stored to the lower tier, e.g., the HDD Tier. Of course, the SSD tier may include flash memory or some form of SSD and/or flash memory array, and the HDD tier may include other forms of storage, such as magnetic tape, optical drives, etc. For the remainder of this description, the higher tier may be called the SSD tier, while the lower tier may be called the HDD tier. However, this in no way is meant to limit the types of storage which are capable of being used on these higher and lower tiers, as would be understood by one of skill in the art.

Now referring to FIG. 3B, a defragmentation process may determine, according to normal processing routines, that the data for FB0 and FB1 which originally pointed to logical blocks LB200 and LB201 should be moved to the storage location occupied by the data pointed to by logical blocks LB100 and LB101. Thus, during defragmentation, after swapping data, logical block mapping for File1 blocks FB0 and FB1 is changed to point to logical blocks LB100 and LB101.

For the client application, the same file blocks FB0 and FB1 are being accessed; however, since the data usage statistics, such as a number of access requests, indicate an insufficient amount of activity directed to the logical blocks LB100 and LB101, the multi-tier system will not detect these logical blocks as being "hot," Therefore, these logical blocks will remain on the lower tier, e.g., the HDD tier. Accordingly, once the data migration is completed, the client application will begin to experience performance degradation as access of logical blocks from the HDD tier is slower than access to logical blocks on the SSD tier. This results in unexpected consequences in the client application behavior.

In addition, logical block LB200 and LB201, which still reside on the SSD tier, may not be accessed at all anymore (depending on which data, if any, was placed there) or very infrequently, and may be candidates to be evicted from the SSD tier. However, in normal tier management, they continue to unnecessarily occupy space on the SSD tier that could be used for LB100 and LB101, due to their out-of-date access request data. This results in underutilization of the limited space on the higher tier, e.g., the SSD tier.

Figure 4:
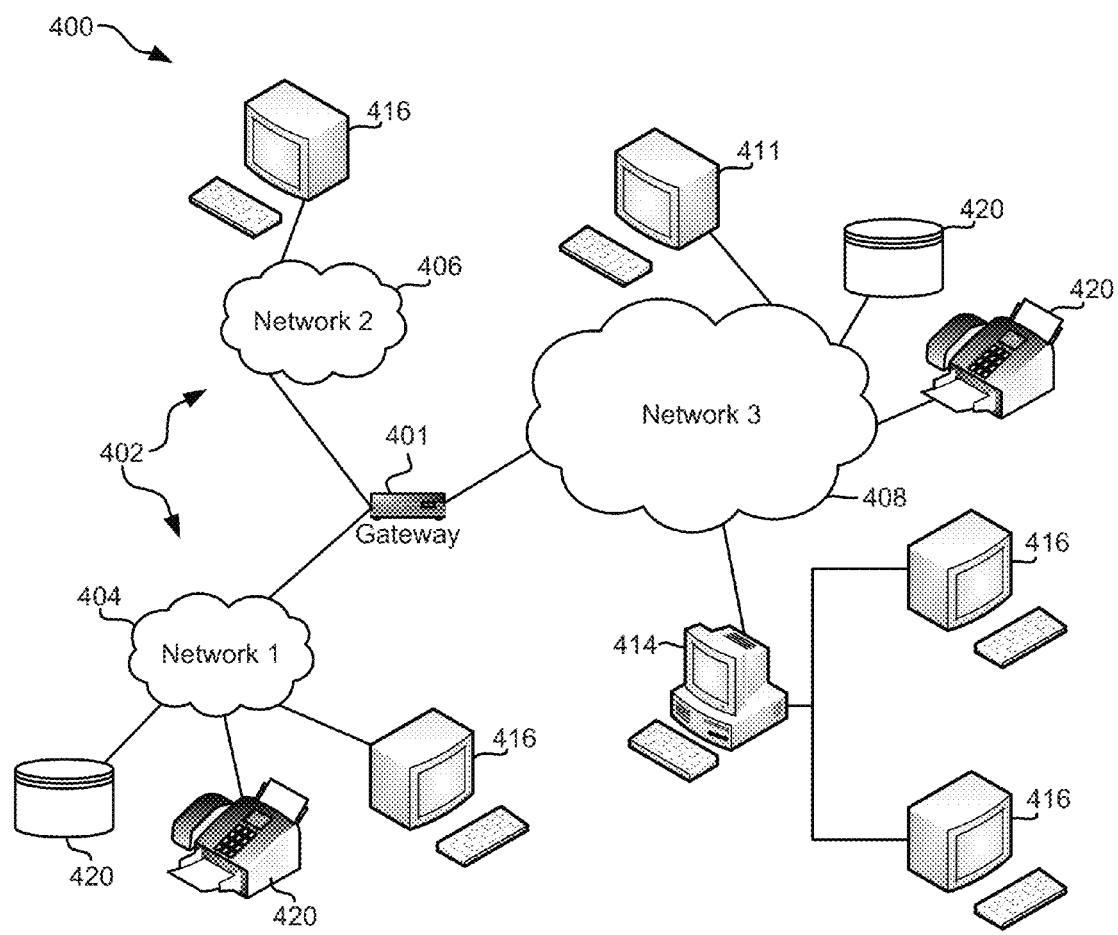
FIG. 4 illustrates a network architecture, in accordance with one embodiment.

FIG. 4 illustrates an architecture 400, in accordance with one embodiment. As shown in FIG. 4, a plurality of remote networks 402 are provided including a first remote network 404 and a second remote network 406. A gateway 401 may be coupled between the remote networks 402 and a proximate network 408. In the context of the present architecture 400, the networks 404, 406 may each take any form including, but not limited to a LAN, a WAN such as the Internet, public switched telephone network (PSTN), internal telephone network, etc.

In use, the gateway 401 serves as an entrance point from the remote networks 402 to the proximate network 408. As such, the gateway 401 may function as a router, which is capable of directing a given packet of data that arrives at the gateway 401, and a switch, which furnishes the actual path in and out of the gateway 401 for a given packet.

Further included is at least one data server 414 coupled to the proximate network 408, and which is accessible from the remote networks 402 via the gateway 401. It should be noted that the data server(s) 414 may include any type of computing device/groupware. Coupled to each data server 414 is a plurality of user devices 416. Such user devices 416 may include a desktop computer, lap-top computer, hand-held computer, printer or any other type of logic. It should be noted that a user device 411 may also be directly coupled to any of the networks, in one embodiment.

A peripheral 420 or series of peripherals 420, e.g., facsimile machines, printers, networked and/or local storage units or systems, etc., may be coupled to one or more of the networks 404, 406, 408. It should be noted that databases and/or additional components may be utilized with, or integrated into, any type of network element coupled to the networks 404, 406, 408. In the context of the present description, a network element may refer to any component of a network.

According to some approaches, methods and systems described herein may be implemented with and/or on virtual systems and/or systems which emulate one or more other systems, such as a UNIX system which emulates an IBM z/OS environment, a UNIX system which virtually hosts a MICROSOFT WINDOWS environment, a MICROSOFT WINDOWS system which emulates an IBM z/OS environment, etc. This virtualization and/or emulation may be enhanced through the use of VMWARE software, in some embodiments.

In more approaches, one or more networks 404, 406, 408, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used.

Figure 5:
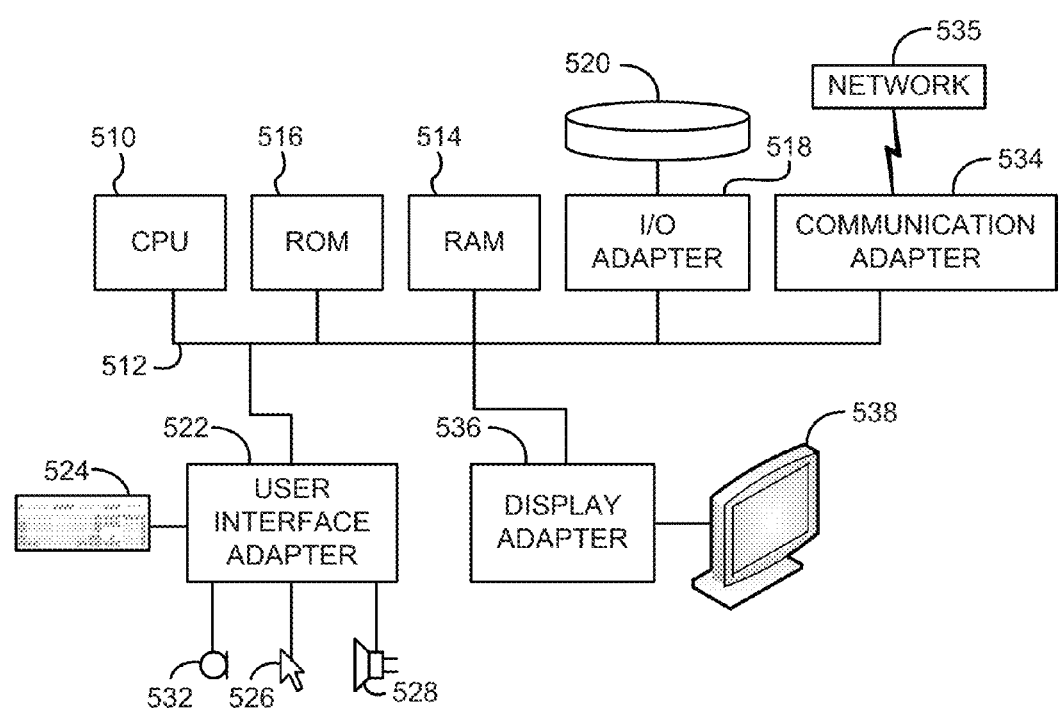
FIG. 5 shows a representative hardware environment that may be associated with the servers and/or clients of FIG. 4, in accordance with one embodiment.

FIG. 5 shows a representative hardware environment associated with a user device 416 and/or server 414 of FIG. 4, in accordance with one embodiment. Such figure illustrates a typical hardware configuration of a workstation having a central processing unit 510, such as a microprocessor, and a number of other units interconnected via a system bus 512.

The workstation shown in FIG. 5 includes a Random Access Memory (RAM) 514, Read Only Memory (ROM) 516, an I/O adapter 518 for connecting peripheral devices such as disk storage units 520 to the bus 512, a user interface adapter 522 for connecting a keyboard 524, a mouse 526, a speaker 528, a microphone 532, and/or other user interface devices such as a touch screen and a digital camera (not shown) to the bus 512, communication adapter 534 for connecting the workstation to a communication network 535 (e.g., a data processing network) and a display adapter 536 for connecting the bus 512 to a display device 538.

The workstation may have resident thereon an operating system such as the Microsoft Windows® Operating System (OS), a MAC OS, a UNIX OS, etc. It will be appreciated that a preferred embodiment may also be implemented on platforms and operating systems other than those mentioned. A preferred embodiment may be written using XML, C, and/or C++ language, or other programming languages, along with an object oriented programming methodology. Object oriented programming (OOP), which has become increasingly used to develop complex applications, may be used.

Figure 6:
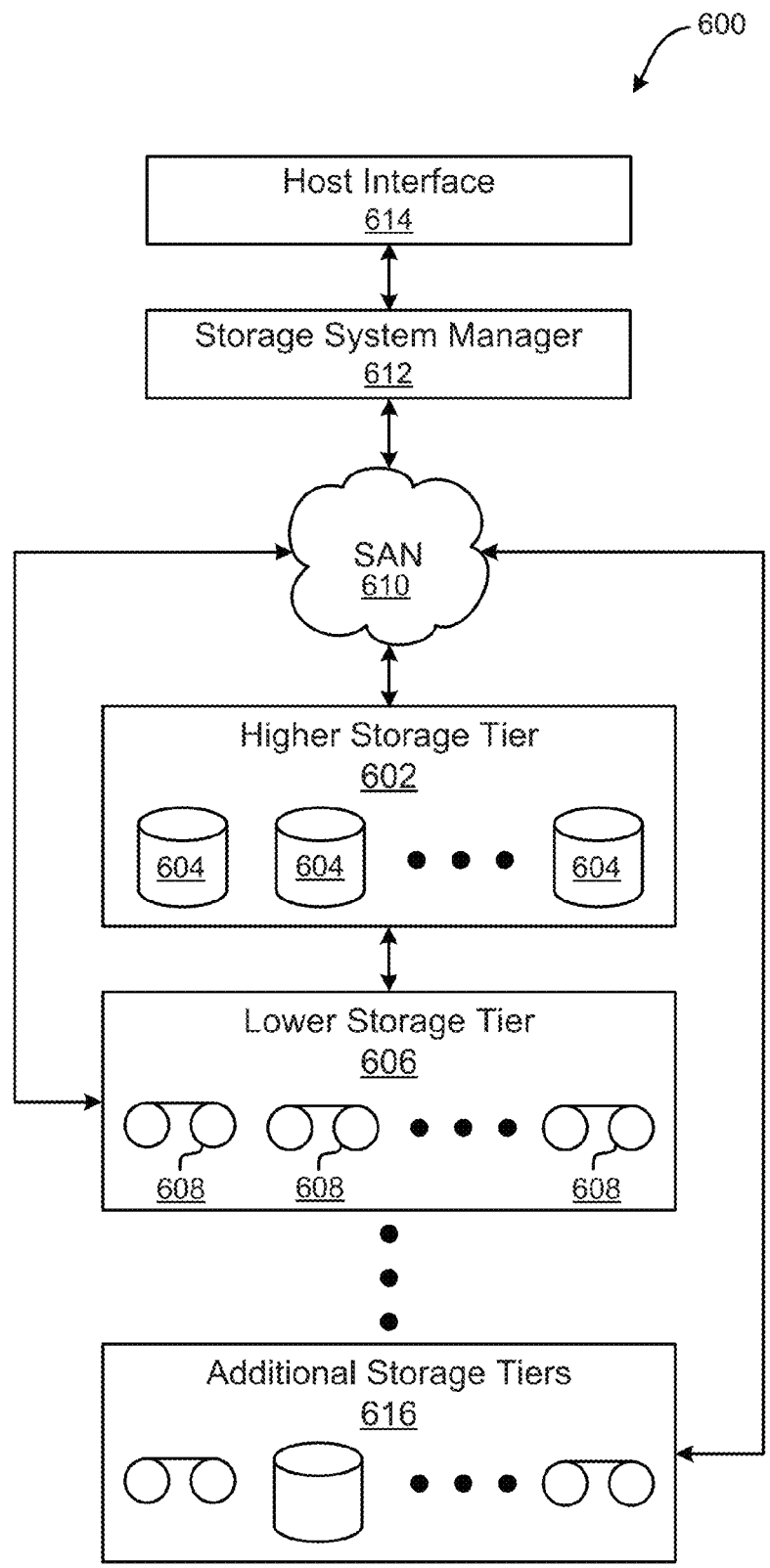
FIG. 6 illustrates a tiered data storage system in accordance with one embodiment.

Now referring to FIG. 6, a storage system 600 is shown according to one embodiment. Note that some of the elements shown in FIG. 6 may be implemented as hardware and/or software, according to various embodiments. The storage system 600 may include a storage system manager 612 for communicating with a plurality of media on a higher storage tier 602 and a lower storage tier 606. The higher storage tier 602 preferably may include one or more random access and/or direct access media 604, such as hard disks in hard disk drives (HDDs), nonvolatile memory (NVM), solid state memory in solid state drives (SSDs), etc., and/or others noted herein. The lower storage tier 606 may preferably include one or more sequential access media 608, such as magnetic tape in tape drives, optical media, etc., and/or others noted herein. Additional storage tiers 616 may include any combination of storage memory media. The storage system manager 612 may communicate with the storage media 604, 608 on the higher and lower storage tiers 602, 606 through a network 610, such as a storage area network (SAN), as shown in FIG. 6. The storage system manager 612 may also communicate with one or more host systems (not shown) through a host interface 614, which may or may not be a part of the storage system manager 612. The storage system manager 612 and/or any other component of the storage system 600 may be implemented in hardware and/or software, and may make use of a processor (not shown) for executing commands of a type known in the art, such as a central processing unit (CPU), a field programmable gate array (FPGA), an application specific integrated circuit (ASIC), etc. Of course, any arrangement of a storage system may be used, as will be apparent to those of skill in the art upon reading the present description.

In more embodiments, the storage system 600 may include any number of data storage tiers, and may include the same or different storage memory media within each storage tier. For example, each data storage tier may include the same type of storage memory media, such as HDDs, SSDs, sequential access media (tape in tape drives, optical disk in optical disk drives, etc.), direct access media (CD-ROM, DVD ROM, etc.), or any combination of media storage types. In one such configuration, a higher storage tier 602, may include a majority of SSD storage media for storing data in a higher performing storage environment, and remaining storage tiers, including lower storage tier 606 and additional storage tiers 616 may include any combination of SSDs, HDDs, tape drives, etc., for storing data in a lower performing storage environment. In this way, more frequently accessed data, data having a higher priority, data needing to be accessed more quickly, etc., may be stored to the higher storage tier 602, while data not having one of these attributes may be stored to the additional storage tiers 616, including lower storage tier 606. Of course, one of skill in the art, upon reading the present descriptions, may devise many other combinations of storage media types to implement into different storage schemes, according to the embodiments presented herein.

According to some embodiments, the storage system (such as 600) may include logic adapted to receive a request to open a data set, logic adapted to determine if the requested data set is stored to a lower storage tier 606 of a tiered data storage system 600 in multiple associated portions, logic adapted to move each associated portion of the requested data set to a higher storage tier 602 of the tiered data storage system 600, and logic adapted to assemble the requested data set on the higher storage tier 602 of the tiered data storage system 600 from the associated portions.

Of course, this logic may be implemented as a method on any device and/or system or as a computer program product, according to various embodiments.

According to one embodiment, efficient data management of high performance tiers in a multi-tier system or architecture may be possible by making the multi-tier system aware of user data block movement activity during a data migration process, such as dc on. A defragmentation application or utility may provide a list of data chunks that have been moved and/or swapped as part of the defragmentation process. In order to account for this data migration, a multi-tier system which monitors data usage statistics may then take into account this data migration when determining which data chunks are accessed frequently ("hot") and achieve a predetermined threshold access requirement, as compared to those which are not accessed as frequently ("cold") and do not achieve the threshold access requirement.

An existing heat count mechanism (which monitors data usage) at a multi-tier monitoring module may be influenced to consider this information and perform heat information statistics exchange between affected blocks.

In one embodiment, a mechanism may account for data movement and migration during a defragmentation process, such as in the form of a list, table, database, etc. In one approach, a list of tuples may be maintained, the list including a set of tuples called "DeBlockFragInfo tuples," that include <OldBlock, NewBlock, Action>, where OldBlock is the original location of the file block prior to migration, NewBlock is the new location for the file block after migration, and Action indicates whether the file block was moved or swapped.

An action of "Moved" is appropriate when the OldBlock is a validly allocated application block and the NewBlock is a free block having no data therein or data unallocated to any application. An action of "Swapped" is appropriate when the OldBlock and the NewBlock are both validly allocated application blocks.

The multi-tier monitoring daemon will receive the DeBlockFragInfo tuple list from some monitoring module or mechanism. For each tuple in the list, based on the action, data usage statistics (such as a "heatmap" which records total number of access requests or accesses of a file block over a certain period of time) may either be swapped or moved from the location of the OldBlock to the location of the NewBlock by updating respective extent hit counters (for a heatmap information transfer) or updating the data usage statistics as appropriate based on the statistic type(s). These updated data usage statistics may then be considered while making decisions for placement of file block chunks on the higher storage tier(s) (e.g., SSD tier(s)) versus placement on lower tiers (HDD tiers, magnetic tape tiers, etc.).

The DeBlockFragInfo tuple list may be passed to a multi-tier storage appliance using any of the following options: sending at the end of the defragmentation process;

sending in intervals during the defragmentation process whenever a particular application or file-group data fragmentation process is completed; or a total size of the DeBlockFragInfo tuple list is greater than a predetermined threshold size value.

For communication between the defragmenter and the multi-tier storage appliance, a separate, out-of-band protocol may be used, reserved fields in the write command descriptor block (CDB), in which small computer system interface (SCSI) commands are sent, may be used, etc. These types of communications ensure that in a remote copy scenario, when a failover occurs, the right data is stored to the higher storage tier. This mechanism may be used for communication of the DeBlockFragInfo tuple from the defragmenter to the multi-tier storage appliance.

Figure 7:
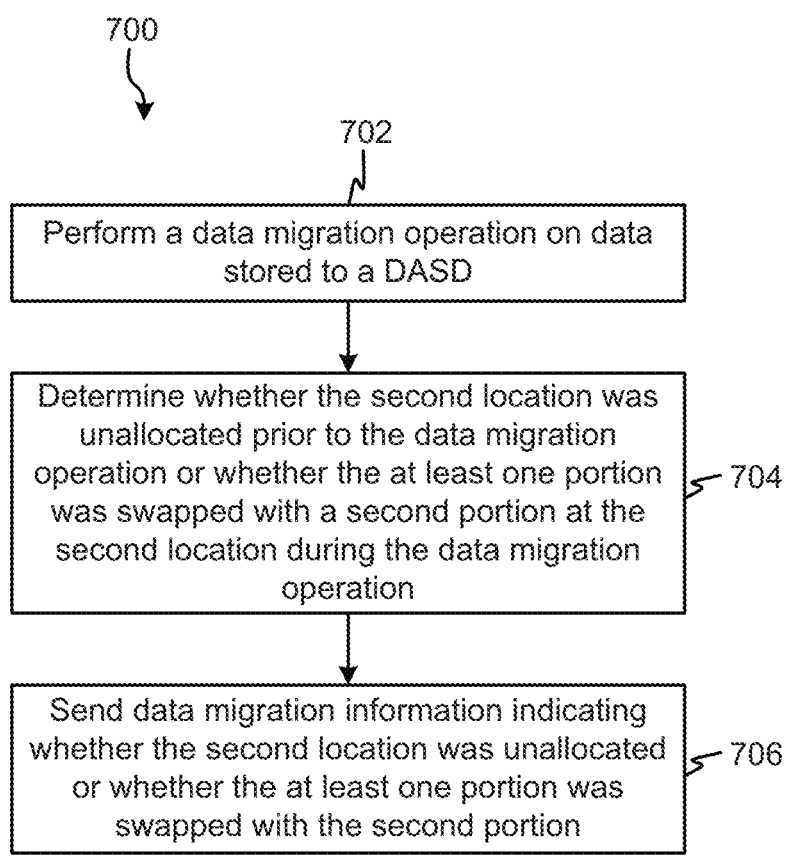
FIG. 7 shows a method for managing data, according to one embodiment.

Referring now to FIG. 7, a flowchart of a method 700 for managing data is shown according to one embodiment. Method 700 may be executed in any desired environment, including those shown in FIGS. 1-6, among others. Furthermore, more or less operations than those specifically described in FIG. 7 may be included in method 700.

In operation 702, a data migration operation is performed on data stored to a DASD that causes at least one portion of the data to be moved from a first location on the DASD to a second location.

In one embodiment, the DASD may be a HDD, a HDD array, a SSD, flash memory, an array of SSDs and/or flash memory, a mixture of data storage types, or some other storage device or combination known in the art.

In another embodiment, the data migration operation may be a defragmentation process, or some other operation which causes data migration, as would be known in the art.

In operation 704, it is determined whether the second location was unallocated prior to the data migration operation or whether the at least one portion was swapped with a second portion at the second location during the data migration operation. These two actions may be referred to as "swapped" and "moved."

In operation 706, data migration information indicating whether the second location was unallocated or whether the at least one portion was swapped with the second portion is sent, such as to a data relocator module, a multi-tier file system, etc.

In one embodiment, the data migration information may be a list of tuples, each tuple relating to one of the at least one portion. The list of tuples includes an indicator for the first location, an indicator for the second location, and an indicator of whether the second location was unallocated or whether the at least one portion was swapped with the second portion.

Figure 8:
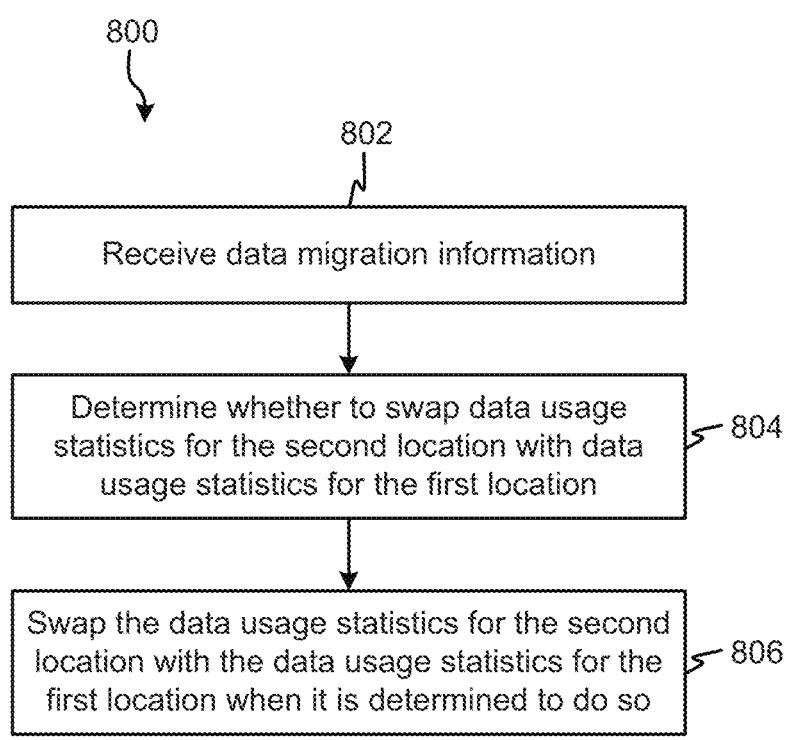
FIG. 8 shows a method for managing data according to one embodiment.

In a further embodiment, method 700 may include some or all operations as described in method 800 shown in FIG. 8 according to one embodiment.

Now referring to FIG. 8, a flowchart of a method 800 for managing data is shown according to one embodiment. Method 800 may be executed in any desired environment, including those shown in FIGS. 1-6, among others. Furthermore, more or less operations than those specifically described in FIG. 8 may be included in method 800.

In operation 802, the data migration information is received, such as at a multi-tier file system, an I/O monitoring daemon, a data relocator, or some other module, logic, or component which is configured to analyze this information and make decisions regarding where to store data on various tiers of the multi-tier file system.

The migration information describes movement of data stored to a DASD during a data migration operation that causes at least one portion of the data to be moved from a first location in a first tier of the multi-tier file system to a second location in a second tier of the multi-tier file system.

In operation 804, it is determined whether to swap data usage statistics for the second location with data usage statistics for the first location. This determination may be based on any criteria known in the art, such as usage, "hot" or "cold" designations, name, location, etc. In addition, the determination may be based on whether the data moved from a higher tier in the multi-tier file system to a lower tier in the multi-tier file system, or vice versa. When the movement does not reallocate the data across tiers, then the usage statistics may remain the same, in one approach.

In one embodiment, the data usage statistics for the second location are swapped with the data usage statistics for the first location when the at least one portion was swapped with the second portion and the second location is not accounted for in the data usage statistics for the first location. In this situation, the usage statistics for the data previously stored at the first location are now applicable to the data currently stored at the second location, since this is the same data, e.g., the at least one first portion.

In addition, in this determination, it is taken into account whether data usage monitoring is able to differentiate between the first location and the second location. For example, when data usage monitoring is performed on a per-extent basis, when the first and second locations are both on the same extent, then their data usage statistics will be substantially the same, and therefore there is no need to swap them. In an alternate example, when the first and second locations are on different extents, then their data usage statistics may be different, and therefore it is beneficial to swap these data usage statistics in order to account for the differences that may be reflected therein for the actual data stored to the two locations.

In operation 806, the data usage statistics for the second location are swapped with the data usage statistics for the first location when the determination in operation 804 is to swap the data usage statistics. In one embodiment, the data usage statistics are swapped in response to a determination that the at least one portion was swapped with the second portion and the second location is not accounted fir in the data usage statistics for the first location. In other approaches, different criteria may be used to make this determination.

In a further embodiment, the data usage statistics for the first location may be reset when the second location was unallocated prior to the data migration operation. This is done because the first location now has no allocated data stored therein, and therefore it should not have data usage statistics that reflect the usage of any data.

In a further embodiment, method 800 may include evicting the second portion from a higher tier of a multi-tier file system and reassigning the second portion to a tower tier when the second portion was stored to the higher tier of the multi-tier file system. In this way, only "hot" data portions are stored to the higher tier.

The methods 700 and 800 may be executed individually or in combination in a system, device, apparatus, and/or computer program product utilizing a computer readable storage medium, according to various embodiments.

The system may include logic (hard and/or soft) that is implemented in a processor, of any type known in the art. The logic may be encompassed by the processor, accessible to the processor, and/or stored to memory that the processor accesses to perform the functionality dictated by the logic, according to various embodiments.

In order to track data usage statistics for each portion of data on any one DASD, it is useful to have a data construct, such as a list, table, database, etc., where data usage statistics may be stored for later analysis. This data construct may take any form known to one of skill in the art. In one example, the data construct may be a heatmap monitoring table, such as the one shown in Table 1, below. In this heatmap monitoring table, information regarding the storage location of each data portion is recorded (such as extent number, starting block identifier, ending block identifier, etc.), along with the number of data access requests received for the data portion during a predetermined period of time (e.g., a heatcount).

TABLE 1

| Extent Number | Starting Block ID | Ending Block ID | HeatCount |
|---|---|---|---|
| 1 | 0 | 9 | 100 |
| 2 | 10 | 19 | 120 |
| 3 | 20 | 29 | 50 |
| 4 | 30 | 39 | 110 |
| 5 | 40 | 49 | 25 |
| 6 | 50 | 59 | 30 |

By maintaining this table, such as at a multi-tier module of the multi-tier file system, the data usage statistics for all data portions on any DASD may be retrieved and used to determine how to store the data portion. A monitoring module may increment the HeatCount by one each time any data blocks in the given range are accessed and/or a request t access the data blocks is received. A data relocator module may refer to these heatcount entries in the heatmap monitoring table to decide whether a given extent (or some other granularity of storage, such as file, block, volume, etc.) may be placed on a higher storage tier, such as a SSD tier, due to higher demand for the data portion, or on a lower storage tier, such as a HDD tier, tape tier, etc., due to lower demand for the data portion.

Figure 9:
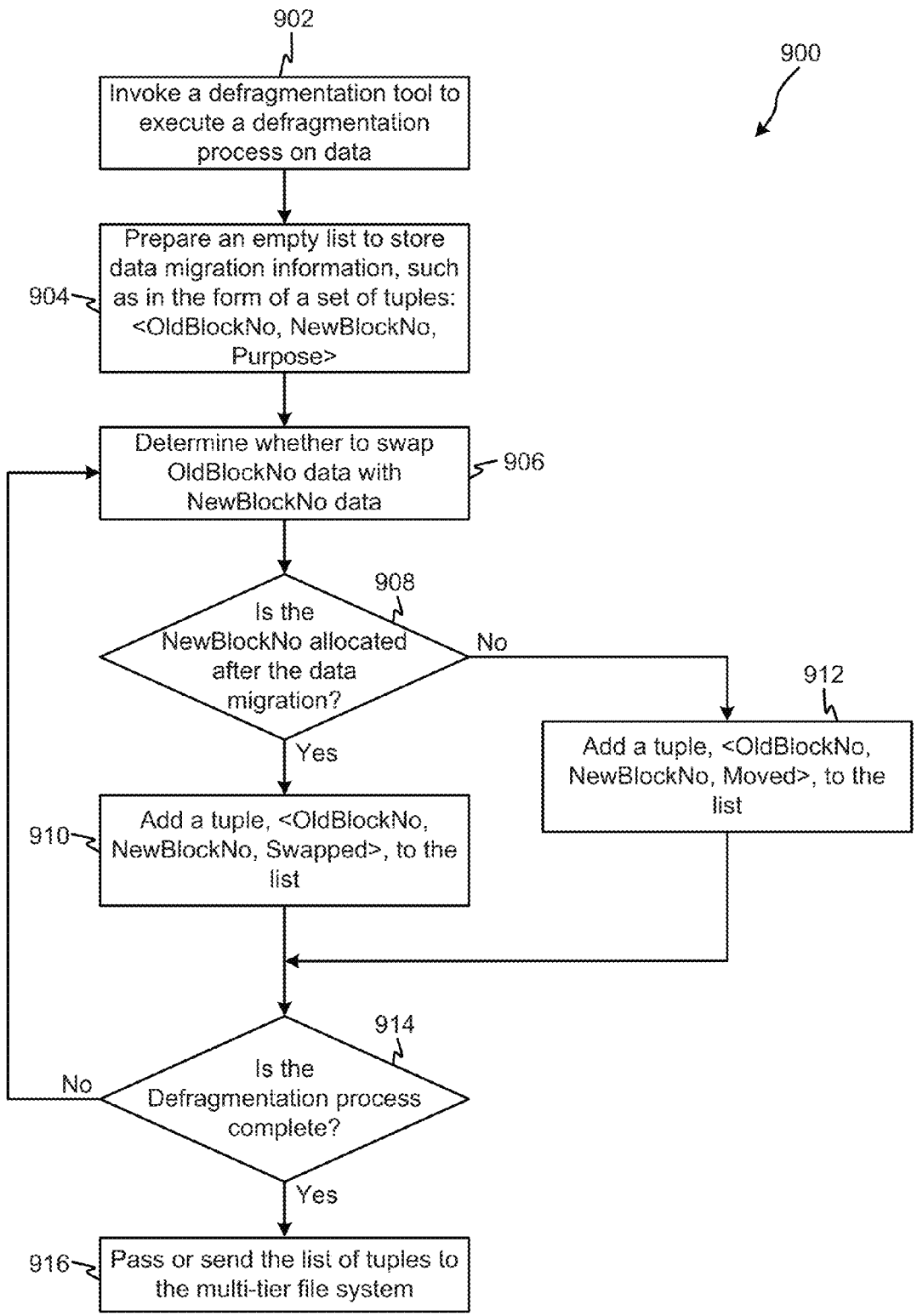
FIG. 9 shows a method for creating migration information according to one embodiment.

Now referring to FIG. 9, a flowchart of a method 900 for creating migration information is shown according to one embodiment. Method 900 may be executed in any desired environment, including those shown in FIGS. 1-6, among others. Furthermore, more or less operations than those specifically described in FIG. 9 may be included in method 900.

For the descriptions of method 900, it is assumed, for exemplary purposes, that the DASD is a HDD, the data migration operation is a disk defragmentation process, changes are recorded in the form of a set of tuples, and the data construct is a heatmap monitoring table.

In operation 902, the multi-tier file system invokes a defragmentation tool to execute a defragmentation process on application data stored to a HDD.

In operation 904, an empty list is created and/or prepared to store changes and movements of data portions of the HDD, e.g., to store DeBlockFragInfo in the form of a set of tuples, e.g., <OldBlockNo, NewBlockNo, Purpose>.

In operation 906, during the defragmentation process, it is determining whether to swap OldBlockNo data with NewBlockNo data. This operation may be performed in order to better store data to the HDD in contiguous groups, instead of spread out across the tracks of the HDD.

In operation 908, it is determined whether the NewBlockNo is allocated after the migration, e.g., whether OldBlockNo had data stored thereto prior to the migration.

When the NewBlockNo is allocated after the migration, method 900 continues to operation 910 where a tuple, <OldBlockNo, NewBlockNo, Swapped>, is added to the list.

When the NewBlockNo is unallocated after the migration, method 900 continues to operation 912 where a tuple, <OldBlockNo, NewBlockNo, Moved>, is added to the list.

In operation 914, it is determined whether the defragmentation process is complete, e.g., all data portions on the HDD have been analyzed to determine their optimum position thereon. If not, method 900 returns to operation 906 to process another data portion.

When the defragmentation process is complete, in operation 916, the list of tuples is passed or sent to the multi-tier file system, particularly the data relocator module. This may be accomplished using an out-of-protocol communication or message to preserve bandwidth fir normal operations.

Figure 10:
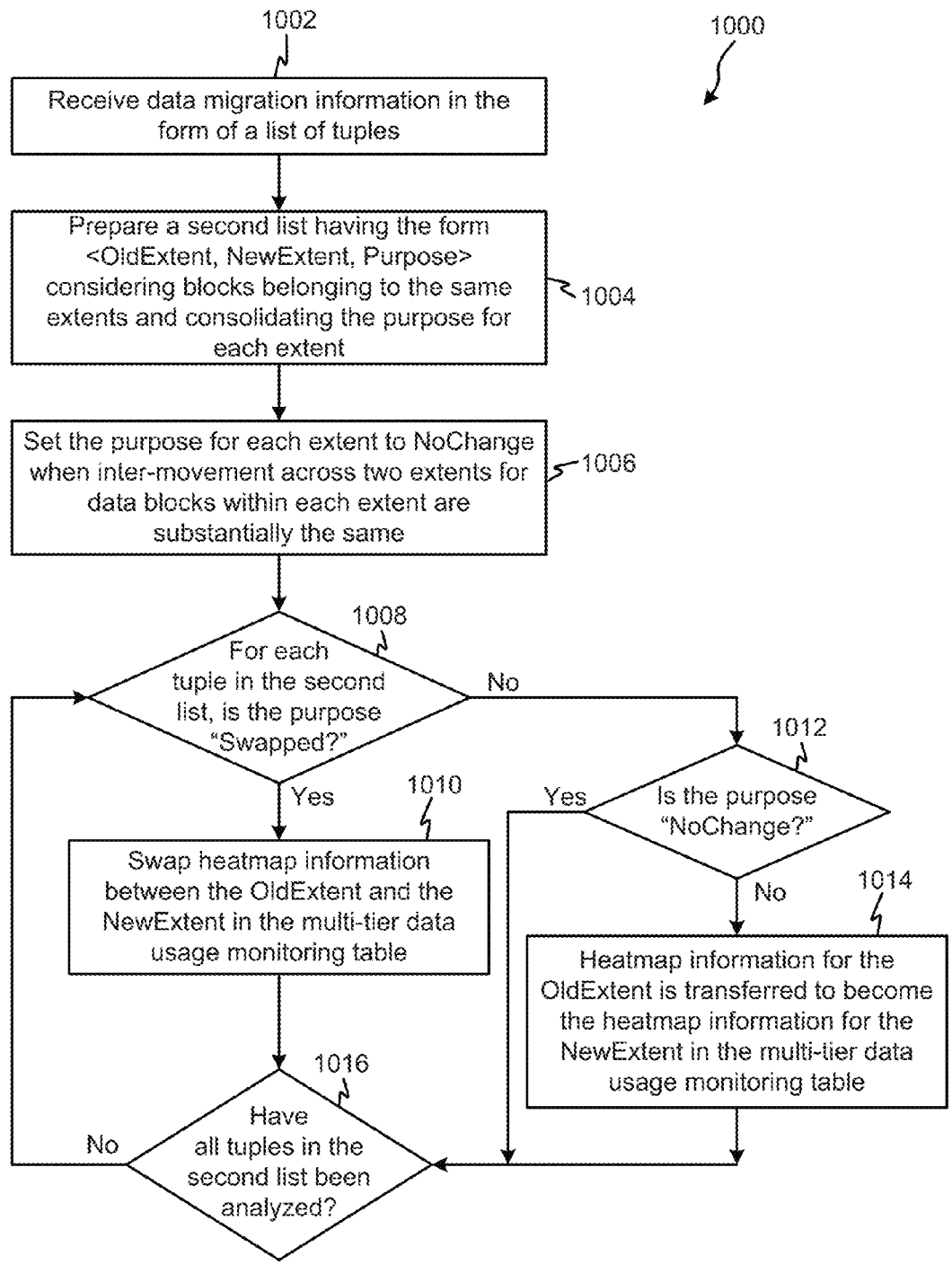
FIG. 10 shows a method for using migration information according to one embodiment.

Now referring to FIG. 10, a method 1000 for using migration information is shown according to one embodiment. Method 1000 may be executed in any desired environment, including those shown in FIGS. 1-6, among others. Furthermore, more or less operations than those specifically described in FIG. 10 may be included in method 1000.

For the descriptions of method 1000, it is assumed, for exemplary purposes, that the DASD is a HDD, the data migration operation is a disk defragmentation process, changes are recorded in the form of a set of tuples, and the data construct is a heatmap monitoring table.

In operation 1002, the list that includes the set of tuples describing data migration on the HDD is received. In one embodiment, this list includes DeBlockFragInfo tuples in the form of <OldBlockNo, NewBlockNo, Purpose>, where the purpose may be swapped or moved.

In operation 1004, another data construct, such as a second list, is prepared that includes information regarding where the old and new data blocks are stored on the HDD in regard to the granularity of the monitoring module. For example, when the monitoring module is capable of monitoring data usage on a per-extent basis, then the data blocks may be related to whichever extent they are stored to in order to determine whether usage statistics will remain the same, or change due to the defragmentation process.

In one embodiment, this second list may take the form of a set of tuples, each tuple including <OldExtent, NewExtent, Purpose>, consolidated for all data blocks which have been swapped and/or moved between the two extents. This takes into consideration blocks belonging to the same extents and consolidates the purpose, since blocks which are swapped or moved within the same extent will have the same data usage statistics when usage monitoring is performed on a per-extent basis.

In operation 1006, the purpose for each tuple is set to NoChange when inter-movement across two extents for data blocks within each extent are substantially the same. Otherwise, when there is a net change in data block usage for any set of extents, the purpose for the tuple relating to those extents remains as swapped. Furthermore, when data blocks only move within the same extent, there is no tuple reported for such movement.

In operation 1008, it is determined whether the purpose is swapped. When it is, method 1000 continues to operation 1010, where heatmap information between the OldExtent and the NewExtent is swapped in the multi-tier data usage monitoring table. If not, method 1000 continues to operation 1012.

In operation 1012, it is determined whether the purpose is NoChange. When it is, method 1000 continues to operation 1016; otherwise, method 1000 continues to operation 1014.

In operation 1014, heatmap information for OldExtent is transferred to become the heatmap information for NewExtent.

Then, in some embodiments, the heatmap information for the OldExtent is reset, since data is no longer being allocated as used in this location. Furthermore, in another embodiment, OldExtent may be evicted from a higher storage tier of the multi-tier file system, such as a SSD tier, when the OldExtent resides thereon prior to the data migration process.

In operation 1016, it is determined whether all tuples in the second list have been analyzed. If not, method 1000 returns to operation 1008 to continue processing the tuples in the second list. When all tuples have been analyzed, method 1000 ends.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable program able read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the users computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a field programmable gate array (FPGA), etc. By executable by the processor, what is meant is that the logic is hardware logic, software logic such as firmware, operating system, etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for managing data, the method comprising:
   receiving migration information that describes movement of data stored to a direct access storage device (DASD) during a data migration operation that causes at least one portion of the data to be moved from a first location in a first tier of a multi-tier file system to a second location in a second tier of the multi-tier file system;
   determining whether to swap data usage statistics for the second location with data usage statistics for the first location; and
   swapping the data usage statistics for the second location with the data usage statistics for the first location when the determination is to swap the data usage statistics.

2. The method as recited in claim 1, wherein the data migration operation is a defragmentation process.

3. The method as recited in claim 1, wherein the data usage statistics for the second location are swapped with the data usage statistics for the first location in response to a determination that the at least one portion of the data was swapped with a second portion of the data and data usage of the second portion of the data in the second location is not accounted for in the data usage statistics for the first location.

4. The method as recited in claim 1, further comprising:
   resetting the data usage statistics for the first location in response to a determination that the second location was unallocated prior to the data migration operation.

5. The method as recited in claim 4, further comprising:
   evicting a second portion of the data from the first tier and reassigning the second portion of the data to a lower tier in response to a determination that the first tier is a higher tier of the multi-tier file system.

6. The method as recited in claim 1, wherein the DASD is at least one of a hard disk drive (HDD) and a solid state drive (SSD), wherein the data usage statistics for the second location comprise a number of access requests for data stored to the second location over a certain period of time, wherein the data usage statistics for the first location comprise a number of access requests for data stored to the first location over the certain period of time, and wherein data blocks which are swapped or moved within a same extent do not have data usage statistics thereof swapped in response to usage monitoring being performed on a per-extent basis.

7. The method as recited in claim 1, further comprising:
   performing the data migration operation on the data stored to the DASD;
   determining whether the second location was unallocated prior to the data migration operation or whether the at least one portion was swapped with a second portion of the data at the second location during the data migration operation to produce data migration information; and
   sending the data migration information indicating whether the second location was unallocated or whether the at least one portion of the data was swapped with the second portion of the data.

8. The method as recited in claim 7, wherein the data migration information is a list of tuples, each tuple relating to one of the at least one portion of the data and comprising an indicator for the first location, an indicator for the second location, and an indicator of whether the second location was unallocated or whether the at least one portion of the data was swapped with the second portion of the data.

9. A computer program product for managing data, the computer program product comprising a computer readable storage medium having program code embodied therewith, the program code readable and/or executable by a processor to cause the processor to:
   receive migration information that describes movement of data stored to a direct access storage device (DASD) during a data migration operation that causes at least one portion of the data to be moved from a first location in a first tier of a multi-tier file system to a second location in a second tier of the multi-tier file system;
   determine whether to swap data usage statistics for the second location with data usage statistics for the first location; and
   swap the data usage statistics for the second location with the data usage statistics for the first location when the determination is to swap the data usage statistics.

10. The computer program product as recited in claim 9, wherein the data usage statistics for the second location are swapped with the data usage statistics for the first location in response to a determination that the at least one portion was swapped with a second portion and the second location is not accounted for in the data usage statistics for the first location.

11. The computer program product as recited in claim 10, wherein the program code readable and/or executable by the processor further causes the processor to:
- evict the second portion from the first tier and reassign the second portion to a lower tier in response to a determination that the first tier is a higher tier of the multi-tier file system,
- wherein the data usage statistics for the second location comprise a number of access requests for data stored to the second location over a certain period of time, and
- wherein the data usage statistics for the first location comprise a number of access requests for data stored to the first location over the certain period of time.

12. The computer program product as recited in claim 9, wherein the program code readable and/or executable by the processor further causes the processor to:
- reset the data usage statistics for the first location in response to a determination that the second location was unallocated prior to the data migration operation.

13. The computer program product as recited in claim 9, wherein the program code readable and/or executable by the processor further causes the processor to:
- perform, by the processor, the data migration operation on the data stored to the DASD;
- determine, by the processor, whether the second location was unallocated prior to the data migration operation or whether the at least one portion was swapped with a second portion at the second location during the data migration operation to produce data migration information; and
- send, by the processor, the data migration information indicating whether the second location was unallocated or whether the at least one portion was swapped with the second portion.

14. The computer program product as recited in claim 13, wherein the data migration information is a list of tuples, each tuple relating to one of the at least one portion and comprising an indicator for the first location, an indicator for the second location, and an indicator of whether the second location was unallocated or whether the at least one portion was swapped with the second portion.

15. The computer program product as recited in claim 13, wherein the program code readable and/or executable by the processor further causes the processor to:
- perform, by the processor, the data migration operation on the data stored to the DASD:
- determine, by the processor, whether the second location was unallocated prior to the data migration operation or whether the at least one portion was swapped with a second portion at the second location during the data migration operation to produce data migration information; and
- send, by the processor, the data migration information indicating whether the second location was unallocated or whether the at least one portion was swapped with the second portion, wherein the data migration information is a list of tuples, each tuple relating to one of the at least one portion and comprising an indicator for the first location, an indicator for the second location, and an indicator of whether the second location was unallocated or whether the at least one portion was swapped with the second portion,
- wherein the data usage statistics for the second location are swapped with the data usage statistics for the first location in response to a determination that the at least one portion of the data was swapped with a second portion of the data and data usage of the second portion of the data in the second location is not accounted for in the data usage statistics for the first location,
- wherein the DASD is a hard disk drive (HDD),
- wherein the data usage statistics for the second location comprise a number of access requests for data stored to the second location over a certain period of time,
- wherein the data usage statistics for the first location comprise a number of access requests for data stored to the first location over the certain period of time,
- wherein data blocks which are swapped or moved within a same extent do not have data usage statistics thereof swapped in response to usage monitoring being performed on a per-extent basis, and
- wherein the data migration operation is a defragmentation process.

16. A system, comprising a processor and logic integrated with and/or executable by the processor, the logic being configured to cause the processor to:
- perform a data migration operation on data stored to a direct access storage device (DASD) that causes at least one portion of the data to be moved from a first location in a first tier of a multi-tier file system to a second location in a second tier of the multi-tier file system;
- determine whether the second location was unallocated prior to the data migration operation or whether the at least one portion was swapped with a second portion at the second location during the data migration operation; and
- send data migration information indicating whether the second location was unallocated or whether the at least one portion was swapped with the second portion.

17. The system as recited in claim 16, wherein the data migration information is a list of tuples, each tuple relating to one of the at least one portion and comprising an indicator for the first location, an indicator for the second location, and an indicator of whether the second location was unallocated or whether the at least one portion was swapped with the second portion.

18. The system as recited in claim 16, wherein the DASD is a hard disk drive (HDD), and wherein the data migration operation is a defragmentation process.

19. The system as recited in claim 16, wherein the logic is further configured to cause the processor to:
- receive the migration information;
- determine whether to swap data usage statistics for the second location with data usage statistics for the first location; and
- swap the data usage statistics for the second location with the data usage statistics for the first location in response to a determination that the at least one portion was swapped with the second portion and the second location is not accounted for in the data usage statistics for the first location.

20. The system as recited in claim 19, wherein the logic is further configured to cause the processor to:
- reset the data usage statistics for the first location in response to a determination that the second location was unallocated prior to the data migration operation; and
- evict the second portion from the first tier and reassign the second portion to a lower tier in response to a determination that the first tier is a higher tier of the multi-tier file system.

* * * * *